Dec. 3, 1935.  H. P. CADY  2,023,164
METHOD AND APPARATUS FOR DETERMINING MOLECULAR WEIGHTS OF GASES OR VAPORS
Filed April 20, 1934   2 Sheets-Sheet 1
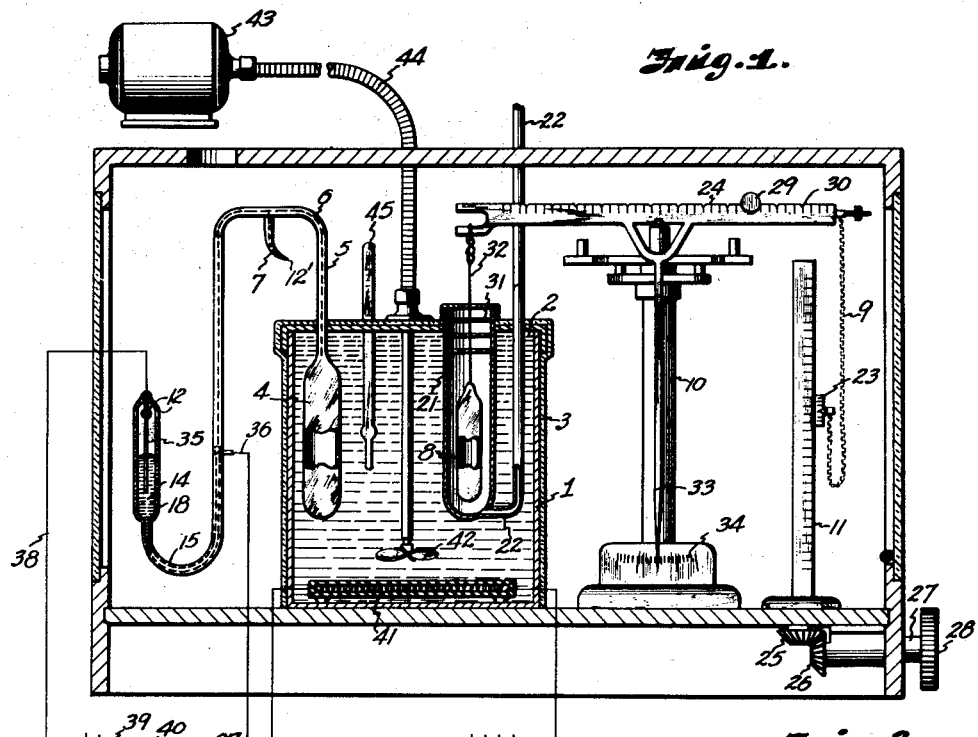
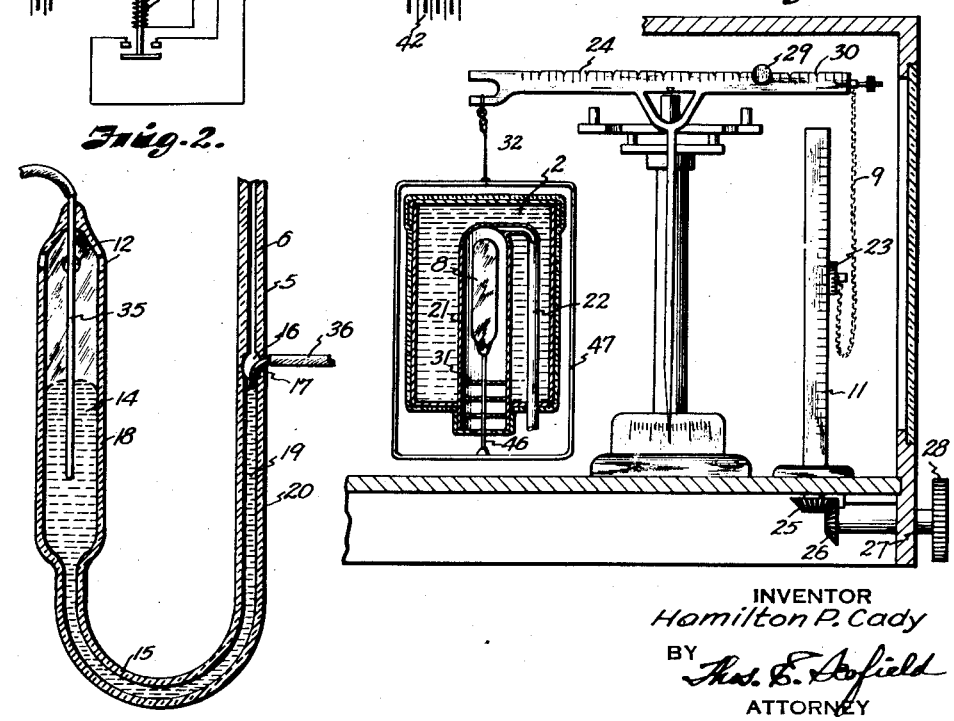
INVENTOR
Hamilton P. Cady
BY
ATTORNEY

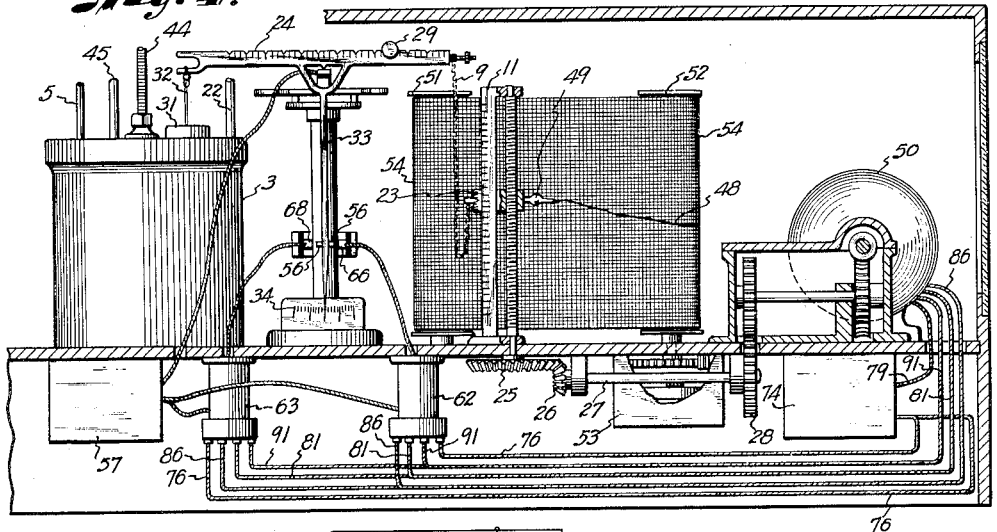

Patented Dec. 3, 1935

2,023,164

UNITED STATES PATENT OFFICE 2,023,164

METHOD AND APPARATUS FOR DETERMINING MOLECULAR WEIGHTS OF GASES OR VAPORS

Hamilton P. Cady, Lawrence, Kans.

Application April 20, 1934, Serial No. 721,518

11 Claims. (Cl. 265—44)

My invention relates to a method and apparatus for determining the molecular or molar weights, specific gravities, or densities of gases or vapors.

The molar or molecular weight of a gaseous substance is proportional to its density. If the latter is expressed in grams per cubic centimeter under the standard conditions for the measurement of gases, that is, 0° C. and 760 mm. of mercury pressure, the molecular weight may be calculated by multiplying the density by 22400. If all gases were "ideal" this multiplier would be 22413.7.

The determination of the molecular weight of a gas or vapor usually involves the direct or indirect determination of the mass or weight, the volume, the temperature and the pressure of a given sample of the gas or vapor. Then by applying the well known gas laws the volume is corrected to standard conditions, the density calculated and from this the molecular weight is obtained.

In the methods of the prior art for determining the molar weight of gases the practice is to determine the weight or mass of a gaseous substance of a given volume under known conditions of temperature and pressure. Throughout this specification I will refer only to gases for the sake of simplicity. It is to be understood, however, that by gases I mean gases or vapors. Some of the methods of the prior art involve the displacement of air by the gas from a known weight or mass of volatile liquid and the measurement of the amount of air under known conditions of temperature and pressure. Certain methods revolve around the measurement of the gaseous pressure exerted by the gas of a known weight at a known temperature and volume. All of these methods involve laborious and tedious computations and offer many opportunities for the introduction of error in the observations.

One object of my invention is to provide a simple and expedient method of determining the molar or molecular weight, specific gravity or density of a gas or vapor.

Another object of my invention is to provide a method for determining the molecular weight of a gas without the necessity of observing the temperature or pressure.

A further object of my invention is to provide a continuous method of rapidly and expediently determining the molar or molecular weight, specific gravity or density of a gas.

Other and further objects of my invention will appear from the following description.

My method is based upon the principle that a body immersed in a fluid experiences a flotation equal to the weight of that volume of the fluid displaced by the body. In its simplest form, the device consists of a sealed float made of glass or other suitable material suspended by a fine wire from the beam of a balance. This float is placed in a suitable chamber through which the gas or vapor whose molecular weight, specific gravity or density is desired may be passed. If the density of the gaseous substance is greater than that of the air the mouth of the chamber is upward; if the gas or vapor is less dense than the air, it is downward and the float is suspended in a frame that holds it in an upright position within the gas chamber. In either event the mouth of the gas chamber is lightly closed by one or more baffles that allow the float support to move freely up or down, but hinder convection and diffusion between the gaseous substance and the air.

This device may be used in several ways. The volume of the float is known in each of these. In one, the balance is brought to its "zero point" with the float in pure dry air at a known temperature and pressure. Then the air is displaced by the gas or vapor to be investigated and the difference in flotation of that substance and that of the air is measured as in ordinary weighings or by the use of suitable riders if the balance is of the well known "Westphal" type. The pressure and temperature must of course be read. From these data and the well known density of air the flotation of the air on the float and also that of the gaseous substance can be readily calculated and expressed as the specific gravity of the gaseous substance referred to air or as molecular weight or density as desired.

Another way is to calculate the flotation of pure dry air on the float at the temperature and pressure existing at the moment, and then place this load on the balance, and adjust the zero point. When this is done, the unloaded balance would swing at this point if it could be placed in a vacuum; and when the air is displaced by any other gaseous substance, the flotation of the latter can be read directly from the "weights" upon the balance or the value and position of the riders. This simplified the calculations. There may, of course, be other ways of using the device; and other substances than air, oxygen or carbon dioxide, for example, may be used as standard substances. In my work I have used each of the above methods, and also one which involves determining the flotation of air saturated with the vapor of a volatile liquid at a known temperature—the temperature, the barometric pressure, and the vapor pressure of the liquid must be known, of course.

If constant conditions of temperature and pressure could be maintained it would be a simple matter to calibrate a balance taking into consideration the volume of the float so that one unit of weight would just balance the flotation of an ideal gas at working temperature and pressure, if that ideal gas had a molar weight of exact unity. Then, as soon as the flotation of any other gas or vapor is balanced by this system of weights or riders, its molecular weight can be read directly without any calculations; or, if desired, the flotation of air or other standard gas can be made the basis of the system of riders or weights, and the specific gravity of the gas or vapor read directly. The same may be done for the density of the gas or vapor, or for any other property that is directly related to the molecular weight or density of the substance.

It is a difficult matter, however, to control both temperature and pressure so as to keep them constant under conditions of observation. My method and means contemplate the control of the temperature of the gas being observed so that while the pressure upon said gas is that of the surrounding air, its temperature is constantly varied so that a certain mass or weight of the gas always occupies the same volume under working conditions. In other words, I control the temperature of the gas being observed to maintain it at a constant density irrespective of variations in atmospheric pressure.

My method of accomplishing this result is to take a suitable gas as a control gas. In the embodiment of the invention to be more fully hereinafter described, I have chosen hydrogen, though it is to be understood that any suitable gas or vapor may be employed. I have chosen as the standardizing temperature 200° C. for purposes of convenience. Any standardizing temperature may be employed, it being remembered of course that the working temperature is constantly changing to compensate for changes of atmospheric pressure.

In carrying out my method I subject the gas being observed to precisely the same conditions of temperature and pressure as the control gas so that if I maintain the density of the control gas at a constant point, I will be enabled by the same means to maintain the density of the gas being observed at a constant point.

In the accompanying drawings which form part of the instant specification and is to be read in conjunction therewith and in which like numbers refer to like parts throughout the several views:

Fig. 1 is a diagrammatic cross section of one form of apparatus embodying apparatus capable of carrying out the method of my invention.

Fig. 2 is an enlarged sectional view of a detail.

Fig. 3 is a fragmentary view of a modification of the form of apparatus shown in Fig. 1.

Figure 4 is a diagrammatic view of one form of the apparatus of my invention fitted with an automatic balancing and recording device.

Figure 5 is a schematic drawing of the electrical connections of the device in Figure 4.

Figure 6 is a schematic view of the electrical connections of another mode of fitting my apparatus with automatic balancing and recording means to be applied to the construction shown in Figure 4.

Referring now to the drawings, I provide a receptacle 1 which is filled with oil 2 or any other suitable high boiling liquid. It is only necessary that the liquid 2 be of sufficiently high boiling point for the temperature range chosen. The receptacle 1 is well insulated by any suitable means such as aluminum foil 3. Disposed within the receptacle 1 and submerged in the bath of oil 2 is a container 4 made of any suitable material as for example "Pyrex" glass. The container 4 is part of the regulatory system of my invention and is filled with the control gas, which in the instant case is hydrogen. I have chosen hydrogen as the control gas partly because at atmospheric pressure and the temperature range over which it is convenient to work, it is a nearly "ideal" gas. Under these conditions the flotation of an ideal gas in the flotation chamber upon the float therein will be very nearly constant independent of prevailing atmospheric pressure. Under these circumstances I am enabled to calibrate my balance in such a manner that molecular weight may be read directly thereon. Similarly, the balance may be calibrated so that specific gravity may be read directly, or density if desired.

The container 4 has a tube 5 communicating therewith provided with an extremely fine capillary bore 6. A branch tube 7 is connected to a source of extremely pure and very dry hydrogen, keeping the container 4 filled and at atmospheric pressure. The gravity existing at the place the instrument is located is known, the atmospheric pressure is read, and from this the temperature is calculated which would enable the float 8, the volume of which is known, to have a buoyancy in an ideal gas having molecular weight of 100 just equal to the full effect of the chain 9 of the balance 10. When the bath has been brought to the desired temperature, calculated as pointed out above, the branch tube 7 is sealed at 12'. The entire volume of gas in the container 4 is subjected to atmospheric pressure, acting through openings 12 upon mercury 14 in the U-tube 15. The capillary bore 6 is slightly enlarged at 16, at which point a fine tungsten wire 17 is sealed through the side of the tube 5. That portion of the tube from the enlargement 16 toward the mercury reservoir 18 is provided with an enlarged bore 19 which is constantly filled with mercury as can be readily seen by reference to Fig. 2. Before the tube 7 was sealed sufficient hydrogen was pumped into the regulatory arrangement so that the surface of the mercury in leg 20 of the U-tube 15 just touched the tungsten contact 17. It will readily be understood, of course, that after the tube has been sealed adjustments may be made by removing or adding mercury in mercury reservoir 18.

Within the oil bath 2 I position a chamber 21 into which a tube 22 passes. The chamber 21 and the tube 22 may be made of any suitable material. The float 8 is made of the same material as is the container 4, preferably "Pyrex" glass. The length of the portion of the tube 22 within the oil bath may be extended if desired to insure that the gas entering the chamber 21 be given sufficient time to reach the temperature of the surrounding bath.

The balance 10 may be of any suitable type well known to the art. I prefer to employ what is known as a "Chainomatic" balance. The balance is provided with a scale 11 carrying a vernier indicator 23, to which the end of a very fine chain 9 is attached. The other end of the chain is attached to the balance arm 24. The indicator 23 is mounted on a screw shaft extending vertically and terminating in beveled gear 25 which engages bevel gear 26, which in turn is secured to shaft 27 terminating in operating member 28. It will be appreciated that as the operating member 28 is turned, the indicator will move up and down allowing a greater or less length of chain to be supported by the balance arm. As the indicator moves upwardly less weight is carried by the balance arm. As the indicator moves downwardly, more weight is carried by the balance arm. The scale 11 is divided into 100 parts, so that by means of the vernier indicator the influence of the chain may be read to 1/1000 part. A rider 29 is provided on the balance arm which is in turn provided with suitable notches 30 so that a load on the balance may be altered by multiples of the whole effect of the chain 9. The upper end of the chamber 21 is provided with a series of baffles 31 fitting a fine suspension wire 32 by which the float 9 is suspended from the balance arm closely enough to hinder the mixing of air with the gas, but sufficiently loose enough so that the pressure of the gas may rapidly adjust itself to that of the air.

Referring now to Figure 4, an electric motor 50 is connected through suitable transmission to actuate gear 28. Mounted adjacent scale 11 are a pair of rollers 51 and 52. Roller 52 is adapted to be driven through suitable clockwork mechanism housed in housing 53 to wind thereupon suitable paper 54 which is wound upon roll 51. It will be obvious from the drawings that the paper which may be cross section paper is adapted to be wound upon roll 52 from roll 51 by the clockwork which drives at a continuous speed. The motor 50 is of a reversing type in which the armature current is adapted to be reversed with respect to the field current. The pointer 33 of the balance carries a pair of contact points 55 and 56. One terminal of a battery 57 is electrically connected to the contact points 55 and 56, the metallic pointer 33 being used as a conductor if desired. The other terminal of battery 57 is connected by conductors 58 and 59 to the coils 60 and 61 of relays 62 and 63 respectively. Relays 62 and 63 are provided with armatures 64 and 65. The other terminal of coil 60 is connected to contact point 66 by conductor 67. The other terminal of coil 61 is connected to contact point 68 by conductor 69. The armature 64 is provided with circuit closing bridges 70 and 71. The armature 65 is provided with circuit closing bridges 72 and 73. The motor 50 is adapted to be actuated from any suitable source of potential as for example battery 74. One terminal of the battery 74 is connected by conductor 75 to conductor 76 which terminates at contact points 77 and 78. The other terminal of battery 74 is connected by conductor 79 to the field winding 80 of the motor 50. The other terminal of the field winding 80 is connected to a conductor 81 which terminates in contact points 82 and 83. One brush 84 of the motor 50 is connected by conductor 85 to the conductor 86 which terminates in contact points 87 and 88. The other brush 89 of the motor 50 is connected by a conductor 90 to a conductor 91 which terminates at contact points 92 and 93.

Referring now to Figure 6, the balance arm 24 is provided with a mirror or polished surface 100 on which is adapted to be focused by lens 101 a beam of light from any suitable source, as for example, incandescent lamp 102. Spacedly positioned from the beam are a pair of light sensitive cells 103 and 104. The position of the light sensitive cells is such that they are adapted to receive the beam of light reflected from mirror 100 when the balance arm 24 is deflected. One terminal of the light sensitive cell 103 is connected to the grid 105 of thermionic tube 106 by conductor 107. A filament 108 of thermionic tube 106 is adapted to be lighted from battery 109. The positive side of battery 100 is connected to the other terminal of light sensitive cell 103. The negative side of battery 110 is connected by conductor 111 to the filament 108 of the thermionic tube 106. The plate 112 of the thermionic tube 106 is connected to the positive side of plate battery 113, the negative terminal of which is connected to one side of coil 61 of relay 63, the other terminal of coil 61 being connected to conductor 111. Light sensitive cell 104 is similarly connected to grid 113 of thermionic tube 114, which is likewise provided with the plate 115 connected to the positive side of battery 116, the negative terminal of which is connected to one side of relay coil 60 by conductor 117. The other side of relay coil 60 is connected to conductor 118 which is connected to the filament 119 of thermionic tube 114. The relay coils 61 and 60 operate similarly to those shown in Figure 5.

In operation, the indicator 23 is set at 28.95, which is the apparent molecular weight of pure dry air free from carbon monoxide at atmospheric pressure and 200° C. A stream of pure dry air is passed through tube 22 and the balance is made to swing with pointer 33 at zero on scale 34. It is obvious, of course, that any other suitable standard gas may be used in place of air, and the indicator 23 of course will be set at a point corresponding to the molecular weight of the standard gas being used. The gas whose molecular weight is to be determined is then led in a gentle continuous stream through pipe 22 into the chamber 21. The flotation of the float 8 will be varied depending upon the molecular weight, or density of the gas being observed. The operating member 28 is adjusted to move the indicator 23 up or down until the balance swings at zero. The reading of the indicator will then give the molar weight of the gas being observed. If the atmospheric pressure is high the density of the gas being observed will be greater than the conditions for which the scale is calibrated. The same atmospheric pressure, of course, acts upon the control gas in container 4 through the holes 12 and upon the mercury which transmits the atmospheric pressure to the control gas. The control gas then will also be more dense to the same extent as is the gas being observed. This permits the column of mercury 19 to make contact with the tungsten wire 17. An electrode 35 extends into the mercury 14 as can be readily seen by reference to Fig. 2. The tungsten contact 17 is connected by conductor 36 to one side of a relay 37. The electrode 35 is connected by conductor 38 to a battery 39, which is connected to the relay by conductor 40. An increase in atmospheric pressure, it will be seen, will complete the circuit through relay 37, causing it to complete the circuit through heating means 41 and battery 42. The temperature of the oil bath 2 will be increased by the heat supplied to it by means 41. An agitating means 42 is provided driven by motor 43 through flexible connection 44, to keep the temperature of the bath at a uniform point. As soon as the control gas in container 4 has been heated to that point which will offset the increased atmospheric pressure, its volume will be such that the contact between tungsten wire 17 and mercury column 19 will be broken, allowing the relay to open the circuit through the heater. It will be observed that by this means I keep the volume of the control gas at a constant point. This is the equivalent of keeping the volume of the control gas at a constant density. Inasmuch as the gas or vapor being observed is subjected to exactly the same conditions of temperature and pressure as is the control gas, its density in turn will be kept at a constant point.

In determining the molar weights of substances which are normally in the liquid or solid state, I have found it convenient to use an ordinary distilling flask fitted with a reflux air condenser, open freely to the air at the top. I vaporize the substance and let the vapor flow gently to the inlet tube 22 in a steady, gentle stream. A constantly flowing stream of vapor is then passing through float chamber 21 and the molar weight of the vapor can be read directly upon scale 11 by adjusting indicator 23, as pointed out above.

My device and method is very reliable and extremely sensitive. I am enabled to substantially instantaneously and constantly determine the molar weight of a gas or vapor and I am thus enabled to determine its purity or its average composition if it is a mixture of two substances. It will be obvious to those skilled in the art that my device has many applications. It may be used to determine variation of one substance in a mixture. It may be used in the chemical and allied industries for the control of distillation processes, the cracking of petroleum oil and extraction of natural gasoline, the determination of the quality or specific gravity of natural and other gases. It is to be understood, of course, that I do not desire to be limited to any particular use, as my device and method may be used when it is desired to determine the density, specific gravity, or molar weight of any gas or vapor, or mixture.

It will also be observed that the temperature of the bath 2 will vary according to the barometric pressure. It would be possible therefore to insert a thermometer 45 in the bath and calibrate it in mm. of mercury thus providing a form of barometer.

Assuming that a stream of vapor is passing through chamber 21 and the balance arm 24 has insufficient chain suspended therefrom to balance the float 8 so that the right hand side of the balance arm as viewed in the figure is elevated, allowing contact point 56 to make contact with contact point 66: this contact will complete the circuit from battery 57 through contact point 56, contact point 66, conductor 67, coil 60 of relay 62, conductor 58, to the other side of battery 57. The current thus flowing will lift armature 64 of the relay and allow bridging members 70 and 71 to complete the circuits across contact points 82 and 87, and 77 and 93 respectively. When this occurs, current will flow from the battery 74 through conductor 79, through the field 80 of the motor 50, through conductor 81, to contact point 82, across bridging member 70, to contact point 87, through conductor 86, through conductor 85, through brush 84, through the armature of motor 50, through brush 89, through conductor 90, through conductor 91, to contact point 93, through bridging member 71, through contact point 77, through conductor 76, through conductor 75, to the other side of the battery. It will be observed that the current is entering the motor through conductor 85 and the motor will rotate in the proper direction to lower indicator 23, thus allowing more chain 9 to be suspended from the balance arm. The indicator 23 carries a pen 49 or other suitable marking means which is in contact with paper 54, being driven past the pen so that a trace 48 which will leave a record, is obtained. As soon as sufficient chain has been suspended from the balance arm, the pointer 33 moves to the left, thus breaking the contact between contact points 56 and 66, allowing the armature 64 to drop and breaking the electrical connection to the motor. If too much chain is suspended from the balance arm, contact point 55 will make contact with contact point 68 and complete the circuit through relay coil 61, lifting armature 65 and completing the circuit from battery 74 through field winding 80 as before, through contact points 83 and 92. Motor current, however, will flow from conductor 91 through conductor 90, through brush 89, through the armature of the motor 50, through brush 84, through conductor 85, through conductor 86, through contact point 88, through bridging member 72, through contact point 78, through conductor 76, through conductor 75, to the other side of battery 74. It will be observed that, in the latter case, the armature current is flowing in an opposite direction from that in which it flowed in the first case so that the motor will rotate in a reverse direction and raise the indicator 23, thus removing the weight of some chain 9 from the balance arm 24, allowing balance to be achieved.

In the form of the invention shown in Figure 6, normal current will flow from the battery 110 through the light sensitive cell 103, through conductor 107, to the grid 105, to the filament 106, through the return conductor 111 to the other side of the battery. Similarly, current will flow from the plate battery 113 to the plate 112, to the filament 106, through return conductor 111 to one side of relay coil 61, to the other side of plate battery 113. The current flowing through the last named circuit is governed by the current flowing through the grid circuit. If the grid is strongly positive, more plate current will flow as is well known to those skilled in the art. Normally, the conductivity of light sensitive cell 103 is such that the flow of the plate current is insufficient to operate relay 63. When a beam of light reflected from light source 102 falls upon light sensitive cell 103 by the inclination of the beam 24 due to the unbalanced condition (as shown in the dotted lines in Figure 6), the conductivity of light sensitive cell 103 is increased so that the grid 105 is more strongly positive. More electrons will be permitted to be emitted from filament 106, thus increasing the rate of flow of the plate current through coil 61. This increase in the rate of flow of the plate current is sufficient to lift the armature 65 and operate the motor in the manner hereinbefore described. Similarly, when a beam of light reflected by mirror 100 falls upon light sensitive cell 104, the armature 64 will be operated to make the contacts described hereinabove through coil 60 of relay 62.

If the gas being observed is lighter than air, the form of apparatus shown in Fig. 3 may be employed, in which chamber 21 is inverted and the float 8 is suspended upon a fine supporting member 46, supported by any suitable means as for example, frame 47 suspended from the balance arm 24.

This is contemplated by and is within the scope of my claims. It is further obvious that various changes may be made in details within the scope of my claims without departing from the spirit of my invention. It is therefore, to be understood that my invention is not to be limited to the specific details shown and described.

Having thus described my invention, what I claim is:

1. A device for determining the molecular weight of gases or vapors including in combination, a float, a chamber, a balance, said float being supported by said balance and being positioned in said chamber, means for introducing gases or vapors into said chamber, and means responsive to atmospheric pressure for controlling the temperature of the gases or vapors being introduced.

2. A device of the character described including in combination, a chamber, a float positioned in said chamber, means for introducing a gas into said chamber, means responsive to atmospheric pressure for controlling the temperature of the gas in said chamber, and means for determining variations in the buoyancy of said float in said gas.

3. A device for determining the molar weight of a gas or vapor including in combination a chamber, a float, means for balancing said float in position in said chamber, means for introducing a gas into said chamber and means responsive to atmospheric pressure for controlling the temperature of said gas.

4. In a device for determining the molar weight of a gas or vapor including in combination a container, a control gas in said container, a chamber, a float, means for balancing said float in position in said chamber, means for introducing a gas or vapor the molar weight of which is to be determined into said chamber, means for subjecting said control gas to atmospheric pressure, means for maintaining the volume of the control gas constant, and means for subjecting the gas or vapor being observed to the action of said last named means.

5. A device as in claim 4 wherein said means for maintaining the volume of said control gas constant comprises means responsive to atmospheric pressure for controlling the temperature of said gas.

6. In a device for determining the molar weights of gases or vapors, a chamber, means for balancing a float in said chamber, means for introducing a gas or vapor the molar weight of which is to be determined into said chamber, and means for maintaining the density of said gas or vapor at a constant point irrespective of changes in atmospheric pressure.

7. In a device for determining the molar weights, specific gravities or densities of gases or vapors, a container, a control gas in said container, means for subjecting said control gas to atmospheric pressure, a chamber, means for flowing a gas or vapor whose molar weight, specific gravity or density is to be determined, through said chamber, a float, means for balancing said float in said chamber, means for maintaining the density of said control gas at a constant point irrespective of variations in atmospheric pressure, and means for subjecting the gas or vapor being observed to the action of said last named means.

8. A device as in claim 7 wherein the means for maintaining the density of said control gas at a predetermined point comprises heating means and means responsive to atmospheric pressure for controlling said heating means.

9. A method of determining the molar weight of a gas comprising the step of maintaining the density of said gas at a constant point while ascertaining the density of said gas.

10. A method of determining the density, specific gravity or molar weight of a gas including the step of varying the temperature of the gas being observed responsive to atmospheric pressure while ascertaining the density of said gas.

11. A method of determining the density of a gas including the steps of maintaining a quantity of gas under atmospheric pressure at a constant volume, by varying its temperature in accordance with atmospheric pressure, and subjecting the gas whose density is to be determined to like variations of temperature at atmospheric pressure while ascertaining the density of said last mentioned gas.

HAMILTON P. CADY.